(12) United States Patent
Ali et al.

(10) Patent No.: US 12,172,592 B1
(45) Date of Patent: Dec. 24, 2024

(54) AUTOMOBILE SAFETY AND FACILITATION SYSTEM

(71) Applicant: KING FAISAL UNIVERSITY, Al-Ahsa (SA)

(72) Inventors: Idris Homed Idris Ali, Al Ahsa (SA); Abdal Halim Musa Yagoub, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/758,177

(22) Filed: Jun. 28, 2024

Related U.S. Application Data

(62) Division of application No. 18/590,869, filed on Feb. 28, 2024, now Pat. No. 12,043,193.

(51) Int. Cl.
*B60R 21/01* (2006.01)
*B60K 20/02* (2006.01)
(Continued)

(52) U.S. Cl.
CPC .............. *B60R 21/01* (2013.01); *B60K 20/02* (2013.01); *B60R 2021/01259* (2013.01);
(Continued)

(58) Field of Classification Search
CPC ........ B60K 41/08; B60K 20/02; B60K 23/08; B62M 11/04; B60R 21/01; B60R 25/00;
(Continued)

(56) References Cited

U.S. PATENT DOCUMENTS 8,050,827 B2 * 11/2011 Hasegawa ............. F16H 61/688
74/335
9,657,825 B2 * 5/2017 Ohmura ............... B60K 17/165
(Continued)

FOREIGN PATENT DOCUMENTS

| CN | 2604335 Y | 2/2004 |
|---|---|---|
| CN | 2778624 Y | 5/2006 |

(Continued)

OTHER PUBLICATIONS

Wang, Jungang, et al. "Nonlinear dynamic characteristics of mechatronics integrated planetary gears considering wear and temperature effects." Proceedings of the Institution of Mechanical Engineers, Part K: Journal of Multi-body Dynamics (2024): 14644193241253979. (Year: 2024).*

(Continued)

*Primary Examiner* — Cuong H Nguyen
(74) *Attorney, Agent, or Firm* — Nath, Goldberg & Meyer; Joshua B. Goldberg

(57) ABSTRACT

A vehicle emergency system can include a gradual speed reduction system comprising: a first vertical rotatable shaft, a first gear, a first external teeth gear, a second external teeth gear fixably attached to the first vertical rotatable shaft, a third external teeth gear configured to mesh and unmesh with the second external teeth gear, a fourth external teeth gear, a primary cylinder, and a second vertical rotatable shaft; an emergency movement system comprising: a second gear, a third vertical rotatable shaft, an internal bearing cylinder, and a carriage comprising four wheels and a gearbox.

6 Claims, 5 Drawing Sheets

(51) Int. Cl.
*B60W 30/09* (2012.01)
*F16D 1/06* (2006.01)
*F16H 3/24* (2006.01)

(52) U.S. Cl.
CPC ............... *B60W 30/09* (2013.01); *F16D 1/06* (2013.01); *F16H 3/24* (2013.01)

(58) Field of Classification Search
CPC . B60R 25/001; B60T 1/06; B60T 1/14; F16D 1/06; F16H 3/24; F16H 55/30; F16H 57/028; F16H 61/12; F16H 5/58
USPC .......................................................... 701/70
See application file for complete search history.

(56) References Cited

U.S. PATENT DOCUMENTS

| | | | |
|---|---|---|---|
| 10,350,996 | B2 | 7/2019 | Tavvala et al. |
| 10,591,036 | B2 * | 3/2020 | Matsuura ................ B60K 17/16 |
| 12,043,193 | B1 * | 7/2024 | Ali .......................... B60R 21/01 |
| 2012/0067147 | A1 * | 3/2012 | Huang .................... B01F 27/88 74/417 |
| 2014/0067218 | A1 | 3/2014 | Stares et al. |

FOREIGN PATENT DOCUMENTS

| | | | | |
|---|---|---|---|---|
| CN | 213808696 | U | | 7/2021 |
| CN | 214305145 | U | | 9/2021 |
| DE | 102020214517 | A1 | * | 5/2022 |
| EP | 0041320 | A2 | | 12/1981 |
| EP | 0102339 | A2 | | 3/1984 |
| GB | 2359597 | A | * | 8/2001 ............. B60K 23/02 |
| KR | 20060007063 | A | | 1/2006 |
| WO | WO-2015008661 | A1 | * | 1/2015 ............. F16H 48/10 |

OTHER PUBLICATIONS

Zarzycki, Edmund. Innovation report: A methodology for estimating gear pump wear-out reliability using pump pressure ripple and an extremely small sample size-the case study of a heavy-duty diesel engine lubrication gear pump. Diss. University of Warwick, (Year: 2020).*

Routh, Bikash, et al. "An investigation on secondary force contacts of tooth pairs in conventional harmonic drives with involute toothed gear set." Proceedings of the Institution of Mechanical Engineers, Part C: Journal of Mechanical Engineering Science 230.4 (2016): 622-638. (Year: 2016).*

Vullo, Vincenzo, and Vincenzo Vullo. "Gears: General Concepts, Definitions and Some Basic Quantities." Gears: vol. 1: Geometric and Kinematic Design (2020): 1-38.*

Bhusal, Krishna Prakash. "Studying the functionality of infinitely variable drive using multibody dynamics simulation approach." (2017).*

* cited by examiner

AUTOMOBILE SAFETY AND FACILITATION SYSTEM

CROSS-REFERENCE TO RELATED APPLICATION

This application is a divisional of U.S. patent application Ser. No. 18/590,869, filed on Feb. 28, 2024, the entire contents of which are incorporated herein by reference.

FIELD AND BACKGROUND

The disclosure of the present application relates to a vehicle emergency system, and particularly to a system and a method of using the system for gradually stopping a vehicle in an emergency.

DESCRIPTION OF THE PRIOR ART

Driving a vehicle, such as a car, is an essential part of people's everyday life. People use vehicles as a means of transportation to get from one place to another. Vehicles provide a convenient and efficient way of traveling, allowing individuals to move quickly and easily between different places. Vehicles provide many purposes such as commuting to work, school, running errands, traveling long distances, shopping, visiting people, leisure, and exploring new places.

While driving a vehicle can be safe in most situations, however there may be times when the vehicle malfunction which puts the occupant(s) of the vehicle in danger. Some of these vehicle emergencies may include faulty brakes, breakage of the vehicle rim(s), tire(s) blowout, faulty airbag(s), stuck accelerator pedal, steering failure, broken steering wheel, and faulty suspension. If any of these vehicle emergencies occur while driving, it may cause the driver of the vehicle to lose control of the vehicle which may lead to bodily injury or even death. The situation is exacerbated when the vehicle is travelling at a high speed.

In light of the above, a need remains for an effective vehicle emergency system and method of using the system for gradually stopping a vehicle in an emergency.

SUMMARY

The present subject matter relates to a vehicle emergency system, a gradual speed reduction system for a vehicle, and an emergency system for the vehicle. The present subject matter further relates to a method of using the vehicle emergency system for gradually stopping the vehicle in an emergency.

The present subject matter relates to a vehicle emergency system which includes a gradual speed reduction system comprising: a first vertical rotatable shaft comprising a first section, a second section, a third section, and a fourth section, with the second section and the third section located sequentially between the first section and the fourth section; a first gear, a first external teeth gear, and a second external teeth gear fixably attached to the first vertical rotatable shaft and located at the first section, the third section, and the fourth section of the first vertical rotatable shaft, respectively; a third external teeth gear configured to mesh and unmesh with the second external teeth gear; a fourth external teeth gear located below the third external teeth gear; a primary cylinder located below the fourth external teeth gear; a second vertical rotatable shaft configured to pass through the third external teeth gear, the fourth external teeth gear, and the primary cylinder, wherein the second vertical rotatable shaft extends beyond the primary cylinder having a primary portion and a secondary portion; an emergency movement system comprising: a second gear comprising a first end and a second end; a third vertical rotatable shaft comprising a first distal part and a second distal part, wherein the third vertical rotatable shaft is located below the second gear, and the first distal part of the third vertical rotatable shaft is configured to fixably attach to the second end of the second gear; an internal bearing cylinder comprising a fourth vertical rotatable shaft, wherein the internal bearing cylinder is located below the third vertical rotatable shaft and is configured to fixably attach to the second distal part of the third vertical rotatable shaft; and a carriage comprising four wheels and a gearbox, wherein the carriage is located below the fourth vertical rotatable shaft and the gearbox is configured to engage with the fourth vertical rotatable shaft of the internal bearing cylinder.

In an embodiment, the gradual speed reduction system can further include an internal teeth roller located above the third external teeth gear; a first internal teeth cylinder located between the internal teeth roller and the fourth external teeth gear, wherein inner surfaces of the third external teeth gear are fixably attached to outer surfaces of the first internal teeth cylinder; a first external teeth cylinder located between the internal teeth roller and the fourth external teeth gear, wherein inner surfaces of the first internal teeth cylinder can be configured to mesh with outer surfaces of the first external teeth cylinder, and the first external teeth cylinder can be configured to mesh and unmesh with inner surfaces of the internal teeth roller; a second internal teeth cylinder fixably attached to an upper surface of the fourth external teeth gear and located below the first external teeth cylinder; a second external teeth cylinder located between the first external teeth cylinder and the second internal teeth cylinder, wherein inner surfaces of the second internal teeth cylinder can be configured to mesh and unmesh with outer surfaces of the second external teeth cylinder; a third external teeth cylinder fixably attached to a lower surface of the fourth external teeth gear and located above the primary cylinder; a third internal teeth cylinder located between the fourth external teeth gear and the primary cylinder, wherein inner surfaces of the third internal teeth cylinder can be configured to mesh with outer surfaces of the third external teeth cylinder; a fourth external teeth cylinder located between the third external teeth cylinder and the primary cylinder; a fourth internal teeth cylinder located between the fourth external teeth cylinder and the primary cylinder, wherein inner surfaces of the fourth internal teeth cylinder can be configured to mesh and unmesh with outer surfaces of the fourth external teeth cylinder; and wherein the second vertical rotatable shaft is further configured to pass through the internal teeth roller, the first internal teeth cylinder, the first external teeth cylinder, the second internal teeth cylinder, the second external teeth cylinder, the third external teeth cylinder, the third internal teeth cylinder, the fourth external teeth cylinder, and the fourth internal teeth cylinder.

In another embodiment, the gradual speed reduction system can further include a separator ring located between the first external teeth cylinder and the second external teeth cylinder; a rectangular piece located between the third internal teeth cylinder and the fourth external teeth cylinder; a first pair of rods comprising: a first part, a second part, and a third part, with the second part located between the first part and the third part; the first part of each rod of the first pair of rods are fixably attached to opposite external surfaces of the third internal teeth cylinder, the second part of each rod of the first pair of rods passes through opposite sides of the rectangular piece; and the third part of each rod of the first pair of rods are fixably attached to opposite external surfaces of the fourth internal teeth cylinder; a first circular ring located between the fourth internal teeth cylinder and the primary cylinder and is configured to fixably attach to a portion of the second vertical rotatable shaft; a second pair of rods comprising: a first peripheral section and a second peripheral section; the first peripheral section of each rod of the second pair of rods are fixably attached to opposite external surfaces of the fourth internal teeth cylinder; and the second peripheral section of each rod of the second pair of rods are fixably attached to opposite external surfaces of the first circular ring; a mounting bracket located adjacent to the primary cylinder and is configured to fixably attach to the primary cylinder; and a stabilizing bracket is configured to fixably attach to the internal teeth roller and the mounting bracket.

In an additional embodiment, the emergency movement system can further include a fifth internal teeth cylinder located between the second gear and the internal bearing cylinder; a fifth external teeth cylinder located between the fifth internal teeth cylinder and the internal bearing cylinder, wherein outer surfaces of the fifth external teeth cylinder can be configured to mesh and unmesh with inner surfaces of the fifth internal teeth cylinder; and wherein the third vertical rotatable shaft is further configured to pass through the fifth internal teeth cylinder and the fifth external teeth cylinder.

In a supplementary embodiment, the emergency movement system can further include a second circular ring located between the second gear and the fifth internal teeth cylinder and is configured to fixably attach to a portion of the third vertical rotatable shaft; a third pair of rods comprising: a first distal region and a second distal region; the first distal region of each rod of the third pair of rods are fixably attached to opposite external surfaces of the fifth internal teeth cylinder; and the second distal region of each rod of the third pair of rods are fixably attached to opposite external surfaces of the second circular ring; a fourth pair of rods comprising: a first distal section and a second distal section; the first distal section of each rod of the fourth pair of rods are fixably attached to opposite external surfaces of the fifth internal teeth cylinder; and the second distal section of each rod of the fourth pair of rods are fixably attached to opposite external surfaces of the internal bearing cylinder; a third circular ring located between the fifth external teeth cylinder and the internal bearing cylinder and is configured to fixably attach to a portion of the third vertical rotatable shaft; a fifth pair of rods comprising: a first distal portion and a second distal portion; the first distal portion of each rod of the fifth pair of rods are fixably attached to opposite upper external surfaces of the internal bearing cylinder; and the second distal portion of each rod of the fifth pair of rods are fixably attached to opposite external surfaces of the third circular ring.

In a further embodiment, the vehicle emergency system can further include a rectangular parallelepiped bar comprising a first portion, a second portion, a third portion, a fourth portion, and a fifth portion, with the second portion, the third portion, and the fourth portion located sequentially between the first portion and the fifth portion; a first rectangular hollow block and a second rectangular hollow block are configured to fixably attach to the first portion and the fifth portion of the rectangular parallelepiped bar, respectively, wherein each of the first rectangular hollow block and the second rectangular hollow block comprised a plurality of vertical walls with a hollow rectangular support therebetween, and the hollow rectangular support is configured to fixably attach to the plurality of vertical walls; a raising and lowering system comprising: an electric jack which can be configured to raise and lower the rectangular parallelepiped bar; a clamping mechanism comprising a plurality of gaskets, wherein an upper surface of the clamping mechanism is configured to fixably attach to a lower surface of the electric jack and an inner surface of the clamping mechanism is configured to attach to the second portion of the rectangular parallelepiped bar; an electric motor which can be configured to provide mechanical energy to the electric jack to perform the raising and lowering of the rectangular parallelepiped bar; and a controller comprising a raising button, a lowering button, a communication cable, and an electrical power plug socket, wherein the raising button can be configured to send a first signal to the electric motor to activate the electric jack to perform the raising of the rectangular parallelepiped bar, the lowering button can be configured to send a second signal to the electric motor to activate the electric jack to perform the lowering of the rectangular parallelepiped bar, the communication cable can be configured to send the first signal and the second signal from the controller to the electric motor, and the electrical power plug socket can be configured to attach to a power supply of a vehicle; wherein the second section of the first vertical rotatable shaft passes through the third portion of the rectangular parallelepiped bar; wherein the primary portion of the second vertical rotatable shaft passes through the fourth portion of the rectangular parallelepiped bar; wherein a lower surface of the primary cylinder is configured to fixably attach to the fourth portion of the rectangular parallelepiped bar; and wherein the mounting bracket is further configured to fixably attach to the fourth portion of the rectangular parallelepiped bar.

In an embodiment, the vehicle emergency system can further include a cardan shaft comprising a first segment, a second segment, a third segment, a fourth segment, a fifth segment, a sixth segment, and a seventh segment, with the second segment, the third segment, the fourth segment, the fifth segment, and the sixth segment located sequentially between the first segment and the seventh segment; a first gearbox comprising: a third gear, a fourth gear, and a fifth gear, with the fourth gear being located between and above the third gear and the fifth gear; the third gear is fixably attached to second segment; the fifth gear is fixably attached to the third segment; and a first surface of the fourth gear can be configured to removably mesh with the third gear and the fifth gear; the first end of the second gear can be configured to mesh with the third gear; a sixth gear fixably attached to the fourth segment of the cardan shaft and can be configured to mesh with the first gear; a second gearbox comprising: a seventh gear, an eighth gear, and a ninth gear, with the eighth gear located between and above the seventh gear and the ninth gear; the seventh gear is fixably attached to the fifth segment; the ninth gear is fixably attached to the sixth segment; a first face of the eighth gear is configured to mesh with the seventh gear and the ninth gear; and a second face of the eighth gear is configured to fixably attach to the secondary portion of the second vertical rotatable shaft; a rear differential located at the seventh segment of the cardan shaft and is configured to connect to rear tires of the vehicle; a vehicle engine system located at the first segment; wherein the vehicle engine system is configured to provide rotational motion to: the first segment; the second segment via the first segment; the third segment via the second segment; the fourth gear via the third gear; the fifth gear via the fourth gear; the third segment via the fifth gear; the fourth segment via the third segment; the sixth gear via the fourth segment; the first gear via the sixth gear; the first vertical rotatable shaft, the first external teeth gear, the second external teeth gear, and the third external teeth gear via the first gear; the fifth segment via the sixth gear; the seventh gear via the fifth segment; the eighth gear via the seventh gear; the ninth gear via the eighth gear; the sixth segment via the ninth gear; the seventh segment via the sixth segment; the rear differential via the seventh segment; and the rear tires via the rear differential; and wherein the third external teeth gear and the eighth gear can be configured to provide equal rotational motion speed to the second vertical rotatable shaft thereby rotating the second vertical rotatable shaft.

In another embodiment, the vehicle engine system can be further configured to provide rotational motion to: the first internal teeth cylinder, the first external teeth cylinder, the second internal teeth cylinder, the second external teeth cylinder, the fourth external teeth gear, the third external teeth cylinder, the third internal teeth cylinder, the fourth external teeth cylinder, and the fourth internal teeth cylinder via the third external teeth gear and the second vertical rotatable shaft; the first pair of rods via the third internal teeth cylinder and the fourth internal teeth cylinder; the rectangular piece via the first pair of rods; and the second pair of rods via the fourth internal teeth cylinder and the second vertical rotatable shaft.

In an additional embodiment, the primary cylinder and the internal teeth roller can be configured to be nonrotatable.

In a supplementary embodiment, the vehicle engine system can be further configured to provide rotational motion to: the second gear via the third gear; the third vertical rotatable shaft via the second gear; the third pair of rods, the fifth internal teeth cylinder, the fifth external teeth cylinder, the fifth pair of rods, and the internal bearing cylinder via the third vertical rotatable shaft; the fourth pair of rods via the fifth internal teeth cylinder and the internal bearing cylinder; the fourth vertical rotatable shaft via the internal bearing cylinder; and the gearbox of the carriage via the fourth vertical rotatable shaft.

In an embodiment, the vehicle emergency system can further include a fifth vertical rotatable shaft comprising a first region and a second region; the first region is configured to fixably attach to a second surface of the fourth gear of the first gearbox; the second region passes through an orifice of the hollow rectangular support of the first rectangular hollow block; a horizontal piece located within the hollow rectangular support of the first rectangular hollow block and is configured to fixably attach to a portion of the hollow rectangular support of the first rectangular hollow block; the second region is configured to fixably attach to the horizontal piece to prevent the second region of the fifth vertical rotatable shaft from falling out of the hollow rectangular support of the first rectangular hollow block; the horizontal piece can be configured to move the fifth vertical rotatable shaft upward via the first rectangular hollow block thereby separating the fourth gear from the third gear and the fifth gear when the rectangular parallelepiped bar is raised via the electric jack; and the horizontal piece can be configured to move the fifth vertical rotatable shaft downward via the first rectangular hollow block thereby meshing the fourth gear with the third gear and the fifth gear when the rectangular parallelepiped bar is lowered via the electric jack.

In a further embodiment, the present subject matter relates to a gradual speed reduction system for a vehicle which includes a first vertical rotatable shaft comprising a first section, a second section, a third section, and a fourth section, with the second section and the third section located sequentially between the first section and the fourth section; a first gear, a first external teeth gear, and a second external teeth gear fixably attached to the first vertical rotatable shaft and located at the first section, the third section, and the fourth section of the first vertical rotatable shaft, respectively; a third external teeth gear can be configured to mesh and unmesh with the second external teeth gear; a fourth external teeth gear located below the third external teeth gear; a primary cylinder located below the fourth external teeth gear; and a second vertical rotatable shaft is configured to pass through the third external teeth gear, the fourth external teeth gear, and the primary cylinder, wherein the second vertical rotatable shaft extends beyond the primary cylinder having a primary portion and a secondary portion.

In an embodiment, the gradual speed reduction system can further include an internal teeth roller located above the third external teeth gear; a first internal teeth cylinder located below the internal teeth roller and above the fourth external teeth gear, wherein inner surfaces of the third external teeth gear are fixably attached to outer surfaces of the first internal teeth cylinder; a first external teeth cylinder located below the internal teeth roller and above the fourth external teeth gear, wherein inner surfaces of the first internal teeth cylinder can be configured to mesh with outer surfaces of the first external teeth cylinder and the first external teeth cylinder can be configured to mesh and unmesh with the internal teeth roller; a second internal teeth cylinder fixably attached to an upper surface of the fourth external teeth gear and located below the first external teeth cylinder; a second external teeth cylinder located between the first external teeth cylinder and the second internal teeth cylinder, wherein inner surfaces of the second internal teeth cylinder can be configured to mesh and unmesh with outer surfaces of the second external teeth cylinder; a third external teeth cylinder fixably attached to a lower surface of the fourth external teeth gear and located above the primary cylinder; a third internal teeth cylinder located below the fourth external teeth gear and above the primary cylinder, wherein inner surfaces of the third internal teeth cylinder can be configured to mesh with outer surfaces of the third external teeth cylinder; a fourth external teeth cylinder located below the third external teeth cylinder and above the primary cylinder; a fourth internal teeth cylinder located below the fourth external teeth cylinder and above the primary cylinder, wherein inner surfaces of the fourth internal teeth cylinder can be configured to mesh and unmesh with outer surfaces of the fourth external teeth cylinder; and wherein the second vertical rotatable shaft is further configured to pass through the internal teeth roller, the first internal teeth cylinder, the first external teeth cylinder, the second internal teeth cylinder, the second external teeth cylinder, the third external teeth cylinder, the third internal teeth cylinder, the fourth external teeth cylinder, and the fourth internal teeth cylinder.

In another embodiment, the gradual speed reduction system can further include a separator ring located between the first external teeth cylinder and the second external teeth cylinder; a rectangular piece located between the third internal teeth cylinder and the fourth external teeth cylinder; a first pair of rods comprising: a first part, a second part, and a third part, with the second part located between the first part and the third part; the first part of each rod of the first pair of rods are fixably attached to opposite external surfaces of the third internal teeth cylinder, the second part of each rod of the first pair of rods passes through opposite sides of the rectangular piece; and the third part of each rod of the first pair of rods are fixably attached to opposite external surfaces of the fourth internal teeth cylinder; a first circular ring is located between the fourth internal teeth cylinder and the primary cylinder and is configured to fixably attach to a portion of the second vertical rotatable shaft; a second pair of rods comprising: a first peripheral section and a second peripheral section; the first peripheral section of each rod of the second pair of rods are fixably attached to opposite external surfaces of the fourth internal teeth cylinder; and the second peripheral section of each rod of the second pair of rods are fixably attached to opposite external surfaces of the first circular ring; a mounting bracket located adjacent to the primary cylinder and is configured to fixably attach to the primary cylinder; and a stabilizing bracket is configured to fixably attach to the internal teeth roller and the mounting bracket.

In a further embodiment, the present subject matter relates to an emergency movement system for a vehicle which includes a second gear comprising a first end and a second end; a third vertical rotatable shaft comprising a first distal part and a second distal part, wherein the third vertical rotatable shaft is located below the second gear and the first distal part of the third vertical rotatable shaft is configured to fixably attach to the second end of the second gear; an internal bearing cylinder comprising a fourth vertical rotatable shaft, wherein the internal bearing cylinder is located below the third vertical rotatable shaft and is configured to fixably attach to the second distal part of the third vertical rotatable shaft; and a carriage comprising four wheels and a gearbox, wherein the carriage is located below the fourth vertical rotatable shaft and the gearbox can be configured to engage with the fourth vertical rotatable shaft of the internal bearing cylinder.

In an embodiment, the emergency movement system can further include a fifth internal teeth cylinder located between the second gear and the internal bearing cylinder; a fifth external teeth cylinder located between the fifth internal teeth cylinder and the internal bearing cylinder, wherein outer surfaces of the fifth external teeth cylinder can be configured to mesh and unmesh with inner surfaces of the fifth internal teeth cylinder; and wherein the third vertical rotatable shaft is further configured to pass through the fifth internal teeth cylinder and the fifth external teeth cylinder.

In another embodiment, the emergency movement system can further include a second circular ring located between the second gear and the fifth internal teeth cylinder and is configured to fixably attach to a portion of the third vertical rotatable shaft; a third pair of rods comprising: a first distal region and a second distal region; the first distal region of each rod of the third pair of rods are fixably attached to opposite external surfaces of the fifth internal teeth cylinder; and the second distal region of each rod of the third pair of rods are fixably attached to opposite external surfaces of the second circular ring; a fourth pair of rods comprising: a first distal section and a second distal section; the first distal section of each rod of the fourth pair of rods are fixably attached to opposite external surfaces of the fifth internal teeth cylinder; and the second distal section of each rod of the fourth pair of rods are fixably attached to opposite external surfaces of the internal bearing cylinder; a third circular ring located between the fifth external teeth cylinder and the internal bearing cylinder and is configured to fixably attach to a portion of the third vertical rotatable shaft; a fifth pair of rods comprising: a first distal portion and a second distal portion; the first distal portion of each rod of the fifth pair of rods are fixably attached to opposite upper external surfaces of the internal bearing cylinder; and the second distal portion of each rod of the fifth pair of rods are fixably attached to opposite external surfaces of the third circular ring.

In a further embodiment, the present subject matter relates to a method of using the above vehicle emergency system for gradually stopping the vehicle which includes driving the vehicle thereby causing the rear tires of the vehicle to rotate via the rotational motion from the vehicle engine system; engaging in a vehicle emergency; pressing the raising button from the controller to send the first signal to the electric motor to activate the electric jack to raise the rectangular parallelepiped bar; raising the first rectangular hollow block as the rectangular parallelepiped bar is being raised thereby moving the fifth vertical rotatable shaft upward resulting in the fourth gear separating from the third gear and the fifth gear; simultaneously raising the gradual speed reduction system as the first rectangular hollow block is being raised via the rectangular parallelepiped bar; providing residual rotational motion to: the fifth gear, the third segment, the fourth segment, the sixth gear, the first gear, the first vertical rotatable shaft, the first external teeth gear, the second external teeth gear, the third external teeth gear, the fifth segment, the seventh gear, the eighth gear, the ninth gear, the sixth segment, the seventh segment, the rear differential, the rear tires, the second vertical rotatable shaft, the first internal teeth cylinder, the first external teeth cylinder, the second internal teeth cylinder, the second external teeth cylinder, the fourth external teeth gear, the third external teeth cylinder, the third internal teeth cylinder, the fourth external teeth cylinder, the fourth internal teeth cylinder, the first pair of rods, the rectangular piece, and the second pair of rods as the fourth gear is being separated from the third gear and the fifth gear; raising the fourth internal teeth cylinder toward the fourth external teeth cylinder to mesh the inner surfaces of the fourth internal teeth cylinder with the outer surfaces of the fourth external teeth cylinder as the gradual speed reduction system is being raised; simultaneously raising the third internal teeth cylinder toward the fourth external teeth gear to lift the fourth external teeth gear toward the third external teeth gear as the fourth internal teeth cylinder is being raised; raising the second internal teeth cylinder toward the second external teeth cylinder to mesh the inner surfaces of the second internal teeth cylinder with the outer surfaces of the second external teeth cylinder as the fourth external teeth gear is being lifted, wherein the meshing of the second internal teeth cylinder and the second external teeth cylinder causes the separator ring to raise the first external teeth cylinder towards the internal teeth roller; meshing the outer surfaces of the first external teeth cylinder with the inner surfaces of the internal teeth roller thereby gradually reducing residual rotational motion speed resulting in the vehicle gradually stopping; and simultaneously raising the third external teeth gear toward the internal teeth roller thereby unmeshing the third external teeth gear from the second external teeth gear as the first external teeth cylinder is being raised.

In an embodiment, the method can further include providing the rotational motion via the third gear of the first gearbox to: the second gear, the third vertical rotatable shaft, the third pair of rods, the fifth internal teeth cylinder, the fifth external teeth cylinder, the fifth pair of rods, the internal bearing cylinder, the fourth pair of rods, the fourth vertical rotatable shaft, and the gearbox of the carriage as the fourth gear is being separated from the third gear and the fifth gear.

In another embodiment, the vehicle emergency can be selected from the group consisting of faulty brakes, breakage of the vehicle rim(s), tire(s) blowout, faulty airbag(s), stuck accelerator pedal, steering failure, broken steering wheel, faulty suspension, other vehicle emergencies, or combinations thereof.

These and other features of the present subject matter will become readily apparent upon further review of the following specification.

DETAILED DESCRIPTION

Figure 1:
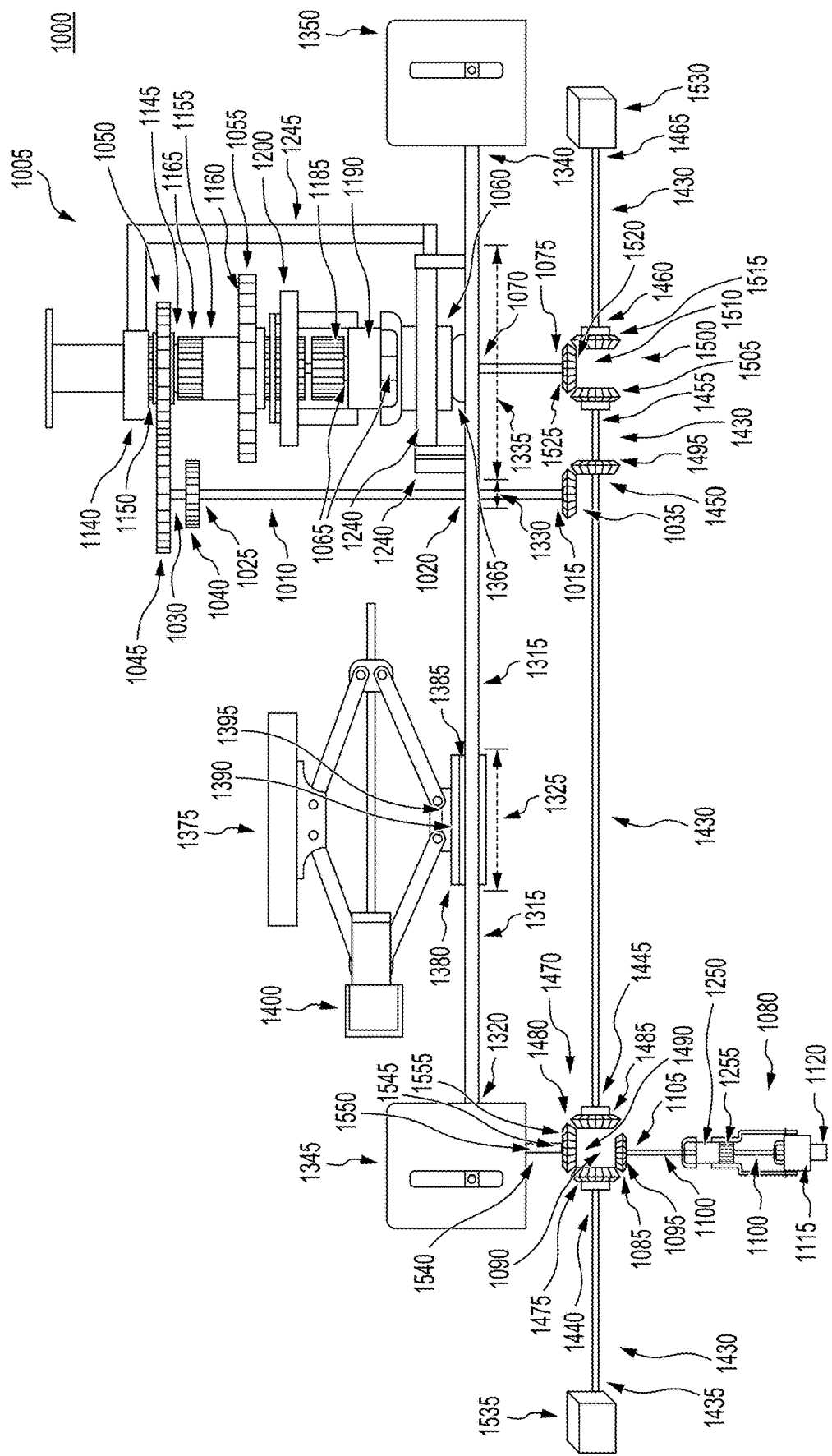
FIG. 1 depicts an overall view of a vehicle emergency system.
Figure 2:
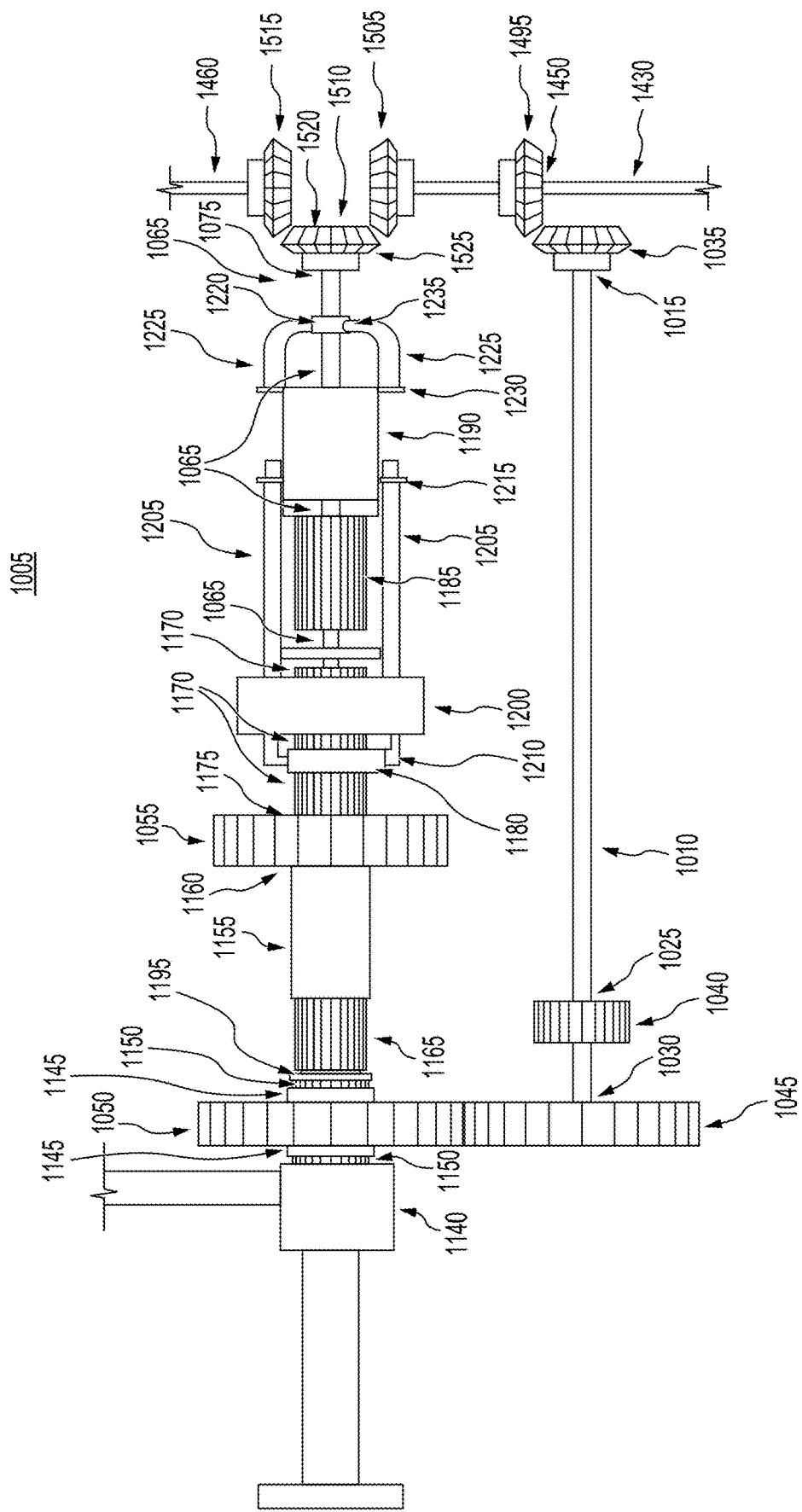
FIG. 2 depicts a gradual speed reduction system which is part of the vehicle emergency system as shown in FIG. 1.
Figure 3:
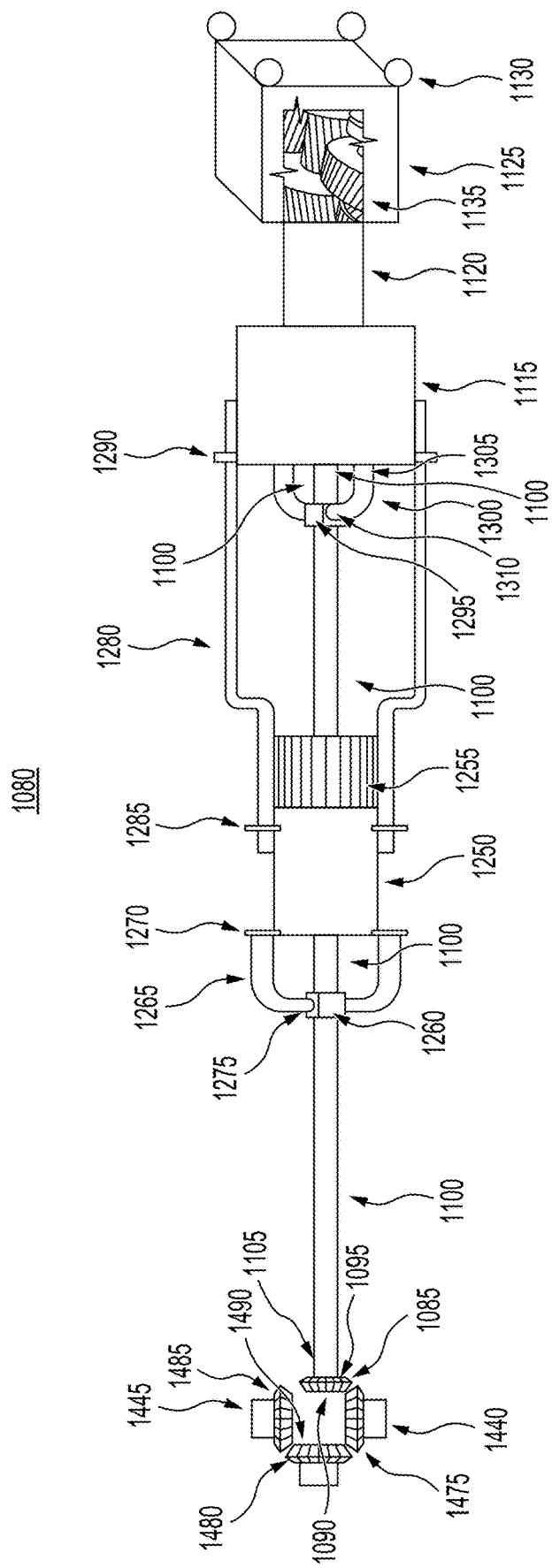
FIG. 3 depicts an emergency movement system which is part of the vehicle emergency system as shown in FIG. 1.

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a vehicle emergency system, a gradual speed reduction system for a vehicle, and an emergency system for the vehicle. The present subject matter further relates to a method of using the vehicle emergency system for gradually stopping the vehicle in an emergency.

FIGS. 1-5 depict, in one embodiment, the vehicle emergency system (1000) which includes a gradual speed reduction system (1005) comprising: a first vertical rotatable shaft (1010) comprising a first section (1015), a second section (1020), a third section (1025), and a fourth section (1030), with the second section (1020) and the third section (1025) located sequentially between the first section (1015) and the fourth section (1030); a first gear (1035), a first external teeth gear (1040), and a second external teeth gear (1045) fixably attached to the first vertical rotatable shaft (1010) and located at the first section (1015), the third section (1025), and the fourth section (1030) of the first vertical rotatable shaft (1010), respectively; a third external teeth gear (1050) configured to mesh and unmesh with the second external teeth gear (1045); a fourth external teeth gear (1055) located below the third external teeth gear (1050); a primary cylinder (1060) located below the fourth external teeth gear (1055); a second vertical rotatable shaft (1065)

configured to pass through the third external teeth gear (1050), the fourth external teeth gear (1055), and the primary cylinder (1060), wherein the second vertical rotatable shaft (1065) extends beyond the primary cylinder (1060) having a primary portion (1070) and a secondary portion (1075); an emergency movement system (1080) comprising: a second gear (1085) comprising a first end (1090) and a second end (1095); a third vertical rotatable shaft (1100) comprising a first distal part (1105) and a second distal part (1110), wherein the third vertical rotatable shaft (1100) is located below the second gear (1085), and the first distal part (1105) of the third vertical rotatable shaft (1100) is configured to fixably attach to the second end (1095) of the second gear (1085); an internal bearing cylinder (1115) comprising a fourth vertical rotatable shaft (1120), wherein the internal bearing cylinder (1115) is located below the third vertical rotatable shaft (1100) and is configured to fixably attach to the second distal part (1110) of the third vertical rotatable shaft (1100); a carriage (1125) comprising four wheels (1130) and a gearbox (1135), wherein the carriage (1125) is located below the fourth vertical rotatable shaft (1120) and the gearbox (1135) is configured to engage with the fourth vertical rotatable shaft (1120) of the internal bearing cylinder (1115).

In an embodiment, the gradual speed reduction system (1005) can further include an internal teeth roller (1140) located above the third external teeth gear (1050). A first internal teeth cylinder (1145) is located between the internal teeth roller (1140) and the fourth external teeth gear (1055). Inner surfaces of the third external teeth gear (1050) are fixably attached to outer surfaces of the first internal teeth cylinder (1145).

A first external teeth cylinder (1150) is located between the internal teeth roller (1140) and the fourth external teeth gear (1055). Inner surfaces of the first internal teeth cylinder (1145) can be configured to mesh with outer surfaces of the first external teeth cylinder (1150). The outer surfaces of the first external teeth cylinder (1150) can also be configured to mesh and unmesh with inner surfaces of the internal teeth roller (1140).

A second internal teeth cylinder (1155) fixably attached to an upper surface (1160) of the fourth external teeth gear (1055) and located below the first external teeth cylinder (1150). A second external teeth cylinder (1165) located between the first external teeth cylinder (1150) and the second internal teeth cylinder (1155). Inner surfaces of the second internal teeth cylinder (1155) can be configured to mesh and unmesh with outer surfaces of the second external teeth cylinder (1165).

A third external teeth cylinder (1170) fixably attached to a lower surface (1175) of the fourth external teeth gear (1055) and located above the primary cylinder (1060). A third internal teeth cylinder (1180) located between the fourth external teeth gear (1055) and the primary cylinder (1060). Inner surfaces of the third internal teeth cylinder (1180) can be configured to mesh with outer surfaces of the third external teeth cylinder (1170).

A fourth external teeth cylinder (1185) located between the third external teeth cylinder (1170) and the primary cylinder (1060). A fourth internal teeth cylinder (1190) located between the fourth external teeth cylinder (1185) and the primary cylinder (1060). Inner surfaces of the fourth internal teeth cylinder (1190) can be configured to mesh and unmesh with outer surfaces of the fourth external teeth cylinder (1185).

The second vertical rotatable shaft (1065) is further configured to pass through the internal teeth roller (1140), the first internal teeth cylinder (1145), the first external teeth cylinder (1150), the second internal teeth cylinder (1155), the second external teeth cylinder (1165), the third external teeth cylinder (1170), the third internal teeth cylinder (1180), the fourth external teeth cylinder (1185), and the fourth internal teeth cylinder (1190).

In another embodiment, the gradual speed reduction system (1005) can further include a separator ring (1195) located between the first external teeth cylinder (1150) and the second external teeth cylinder (1165). The separator ring (1195) is fixably attached to the second vertical rotatable shaft (1065). The separator ring (1195) is configured to raise the first external teeth cylinder (1150) upward toward the internal teeth roller (1140) as the second internal teeth cylinder (1155) is being raised upward thereby allowing the third external teeth gear (1050) to be raised upward toward the internal teeth roller (1140) as described herein.

A rectangular piece (1200) located between the third internal teeth cylinder (1180) and the fourth external teeth cylinder (1185). A first pair of rods (1205) comprising: a first part (1210), a second part (not shown), and a third part (1215), with the second part (not shown) located between the first part (1210) and the third part (1215). The first part (1210) of each rod of the first pair of rods (1205) are fixably attached to opposite external surfaces of the third internal teeth cylinder (1180). The second part (not shown) of each rod of the first pair of rods (1205) passes through opposite sides of the rectangular piece (1200). The third part (1215) of each rod of the first pair of rods (1205) are fixably attached to opposite external surfaces of the fourth internal teeth cylinder (1190).

A first circular ring (1220) located between the fourth internal teeth cylinder (1190) and the primary cylinder (1060) and is configured to fixably attach to a portion of the second vertical rotatable shaft (1065). A second pair of rods (1225) comprising: a first peripheral section (1230) and a second peripheral section (1235). The first peripheral section (1230) of each rod of the second pair of rods (1225) are fixably attached to opposite external surfaces of the fourth internal teeth cylinder (1190). The second peripheral section (1235) of each rod of the second pair of rods (1225) are fixably attached to opposite external surfaces of the first circular ring (1220).

A mounting bracket (1240) located adjacent to the primary cylinder (1060) and is configured to fixably attach to the primary cylinder (1060). A stabilizing bracket (1245) is configured to fixably attach to the internal teeth roller (1140) and the mounting bracket (1240). Due to the attachments to the mounting bracket (1240) and the stabilizing bracket (1245), the primary cylinder (1060) and the internal teeth roller (1140) can be configured to be nonrotatable.

In an additional embodiment, the emergency movement system (1080) can further include a fifth internal teeth cylinder (1250) located between the second gear (1085) and the internal bearing cylinder (1115). A fifth external teeth cylinder (1255) located between the fifth internal teeth cylinder (1250) and the internal bearing cylinder (1115). Outer surfaces of the fifth external teeth cylinder (1255) can be configured to mesh and unmesh with inner surfaces of the fifth internal teeth cylinder (1250). The third vertical rotatable shaft (1100) is further configured to pass through the fifth internal teeth cylinder (1250) and the fifth external teeth cylinder (1255).

In a supplementary embodiment, the emergency movement system (1080) can further include a second circular ring (1260) located between the second gear (1085) and the fifth internal teeth cylinder (1250). The second circular ring (1260) is configured to fixably attach to a portion of the third vertical rotatable shaft (1100). A third pair of rods (1265) comprising: a first distal region (1270) and a second distal region (1275). The first distal region (1270) of each rod of the third pair of rods (1265) are fixably attached to opposite external surfaces of the fifth internal teeth cylinder (1250). The second distal region (1275) of each rod of the third pair of rods (1265) are fixably attached to opposite external surfaces of the second circular ring (1260).

A fourth pair of rods (1280) comprising: a first distal section (1285) and a second distal section (1290). The first distal section (1285) of each rod of the fourth pair of rods (1280) are fixably attached to opposite external surfaces of the fifth internal teeth cylinder (1250). The second distal section (1290) of each rod of the fourth pair of rods (1280) are fixably attached to opposite external surfaces of the internal bearing cylinder (1115).

A third circular ring (1295) located between the fifth external teeth cylinder (1255) and the internal bearing cylinder (1115). The third circular ring (1295) is configured to fixably attach to a portion of the third vertical rotatable shaft (1100). A fifth pair of rods (1300) comprising: a first distal portion (1305) and a second distal portion (1310). The first distal portion (1305) of each rod of the fifth pair of rods (1300) are fixably attached to opposite upper external surfaces of the internal bearing cylinder (1115). The second distal portion (1310) of each rod of the fifth pair of rods (1300) are fixably attached to opposite external surfaces of the third circular ring (1295).

In a further embodiment, the vehicle emergency system (1000) can further include a rectangular parallelepiped bar (1315) comprising a first portion (1320), a second portion (1325), a third portion (1330), a fourth portion (1335), and a fifth portion (1340), with the second portion (1325), the third portion (1330), and the fourth portion (1335) located sequentially between the first portion (1320) and the fifth portion (1340).

Figure 4:
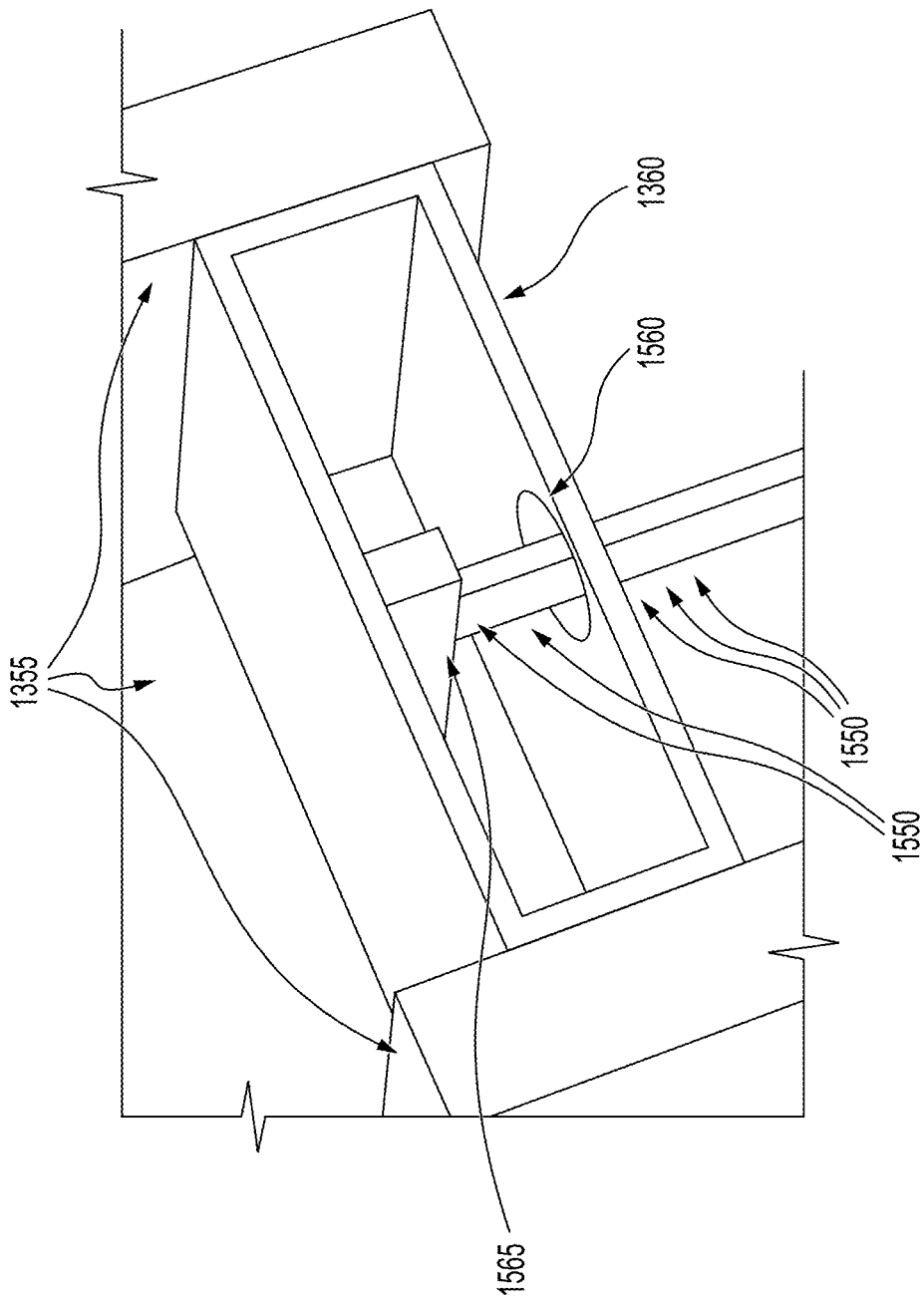
FIG. 4 depicts an assembly, which is part of the vehicle emergency system as shown in FIG. 1, that is part of a first rectangular bock with a second region of a fifth vertical rotatable shaft being located within a hollow rectangular support.
Figure 5:
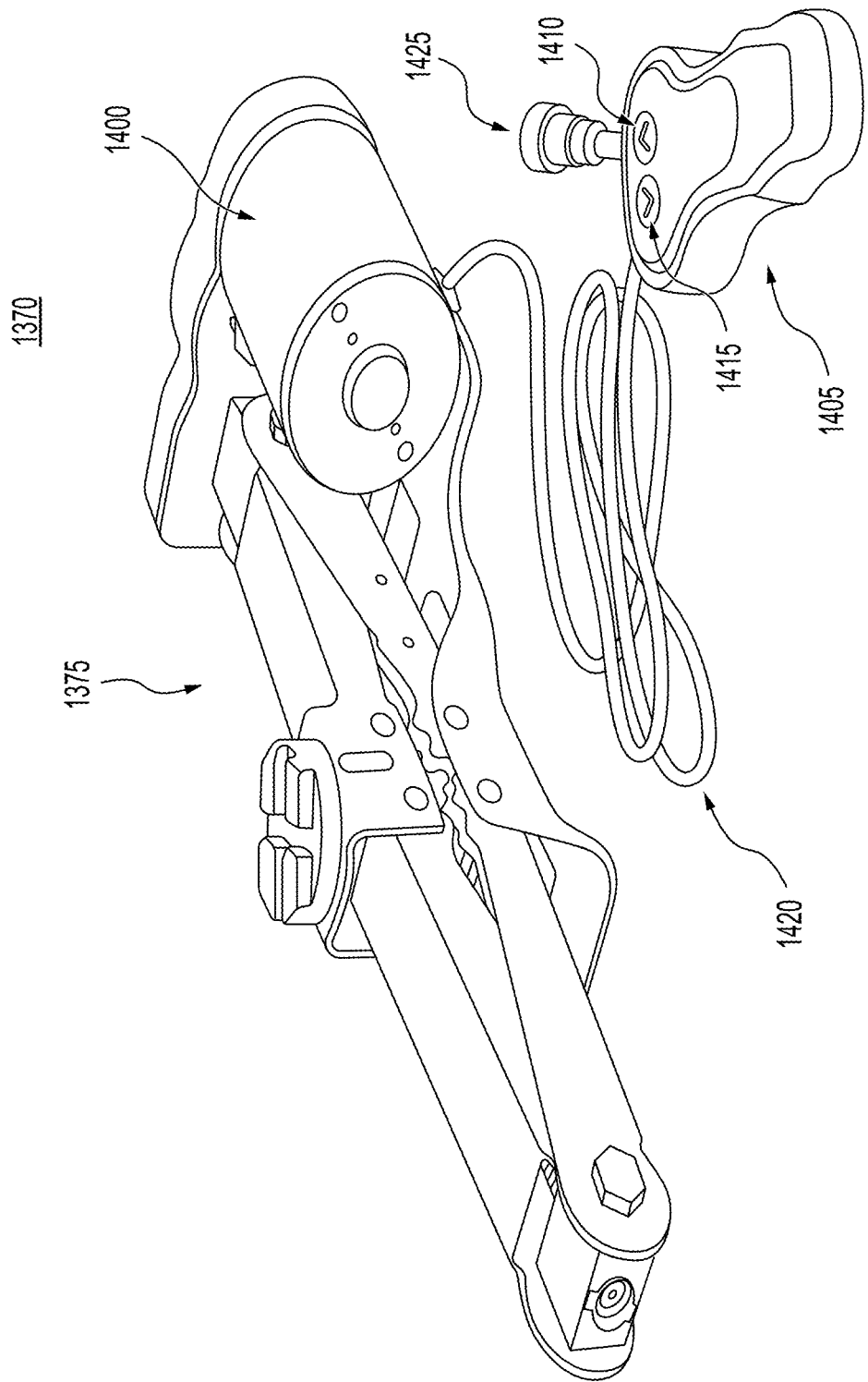
FIG. 5 depicts an overall view of a raising and lowering system which is part of the vehicle emergency system as shown in FIG. 1.

A first rectangular hollow block (1345) and a second rectangular hollow block (1350) are configured to fixably attach to the first portion (1320) and the fifth portion (1340) of the rectangular parallelepiped bar (1315), respectively. Each of the first rectangular hollow block (1345) and the second rectangular hollow block (1350) comprised a plurality of vertical walls (1355) with a hollow rectangular support (1360) therebetween as shown in FIG. 4. The hollow rectangular support (1360) is configured to fixably attach to the plurality of vertical walls (1355).

The second section (1020) of the first vertical rotatable shaft (1010) passes through the third portion (1330) of the rectangular parallelepiped bar (1315). The primary portion (1070) of the second vertical rotatable shaft (1065) passes through the fourth portion (1335) of the rectangular parallelepiped bar (1315). A lower surface (1365) of the primary cylinder (1060) is configured to fixably attach to the fourth portion (1335) of the rectangular parallelepiped bar (1315). The mounting bracket (1240) is further configured to fixably attach to the fourth portion (1335) of the rectangular parallelepiped bar (1315).

A raising and lowering system (1370) comprising an electric jack (1375) which can be configured to raise and lower the rectangular parallelepiped bar (1315). In a non-limiting embodiment, the electric jack (1375) can be an electric scissor jack. A clamping mechanism (1380) comprising a plurality of gaskets (1385). An upper surface (1390) of the clamping mechanism (1380) is configured to fixably attach to a lower surface (1395) of the electric jack (1375). An inner surface of the clamping mechanism (1380) is configured to attach to the second portion (1325) of the rectangular parallelepiped bar (1315).

An electric motor (1400) can be configured to provide mechanical energy to the electric jack (1375) to perform the raising and lowering of the rectangular parallelepiped bar (1315).

A controller (1405) comprising a raising button (1410), a lowering button (1415), a communication cable (1420), and an electrical power plug socket (1425).

The raising button (1410) can be configured to send a first signal to the electric motor (1400) to activate the electric jack (1375) to perform the raising of the rectangular parallelepiped bar (1315). The lowering button (1415) can be configured to send a second signal to the electric motor (1400) to activate the electric jack (1375) to perform the lowering of the rectangular parallelepiped bar (1315). In another non-limiting embodiment, the raising button (1410) and the lowering button (1415) can be configured to communicate with a vehicle's computer system (not shown) via direct wiring connection (not shown) thereby allowing a driver of the vehicle to raise and lower the rectangular parallelepiped bar (1315) via the vehicle's computer system (not shown).

The communication cable (1420) can be configured to send the first signal and the second signal from the controller (1405) to the electric motor (1400). The electrical power plug socket (1425) can be configured to attach to a power supply of a vehicle (not shown). In a particular non-limiting embodiment, the vehicle's power supply can be a vehicle's cigarette lighter (not shown), a vehicle's auxiliary power outlet (not shown), other vehicle's power supply, or combinations thereof.

In an embodiment, the vehicle emergency system (1000) can further include a cardan shaft (1430) comprising a first segment (1435), a second segment (1440), a third segment (1445), a fourth segment (1450), a fifth segment (1455), a sixth segment (1460), and a seventh segment (1465), with the second segment (1440), the third segment (1445), the fourth segment (1450), the fifth segment (1455), and the sixth segment (1460) located sequentially between the first segment (1435) and the seventh segment (1465).

A first gearbox (1470) comprising a third gear (1475), a fourth gear (1480), and a fifth gear (1485), with the fourth gear (1480) located between and above the third gear (1475) and the fifth gear (1485). The third gear (1475) is fixably attached to second segment (1440). The fifth gear (1485) is fixably attached to the third segment (1445). A first surface (1490) of the fourth gear (1480) can be configured to removably mesh with the third gear (1475) and the fifth gear (1485). The first end (1090) of the second gear (1085) can be configured to mesh with the third gear (1475).

A sixth gear (1495) fixably attached to the fourth segment (1450) of the cardan shaft (1430) and can be configured to mesh with the first gear (1035).

A second gearbox (1500) comprising a seventh gear (1505), an eighth gear (1510), and a ninth gear (1515), with the eighth gear (1510) located between and above the seventh gear (1505) and the ninth gear (1515).

The seventh gear (1505) is fixably attached to the fifth segment (1455). The ninth gear (1515) is fixably attached to the sixth segment (1460). A first face (1520) of the eighth gear (1510) can be configured to mesh with the seventh gear (1505) and the ninth gear (1515). A second face (1525) of the eighth gear (1510) is configured to fixably attach to the secondary portion (1075) of the second vertical rotatable shaft (1065).

A rear differential (1530) located at the seventh segment (1465) of the cardan shaft (1430) and is configured to connect to rear tires of the vehicle (not shown).

A vehicle engine system (1535) located at the first segment (1435). The vehicle engine system (1535) comprises at least an engine and a transmission. The vehicle engine system (1535) can be configured to provide rotational motion to: the first segment (1435); the second segment (1440) via the first segment (1435); the third gear (1475) via the second segment (1440); the second gear (1085) via the third gear (1475); the third vertical rotatable shaft (1100) via the second gear (1085); the third pair of rods (1265), the fifth internal teeth cylinder (1250), the fifth external teeth cylinder (1255), the fifth pair of rods (1300), and the internal bearing cylinder (1115) via the third vertical rotatable shaft (1100); the fourth pair of rods (1280) via the fifth internal teeth cylinder (1250) and the internal bearing cylinder (1115); the fourth vertical rotatable shaft (1120) via the internal bearing cylinder (1115); and the gearbox (1135) of the carriage (1125) via the fourth vertical rotatable shaft (1120). The rotational motion to all of the aforementioned components can occur regardless of the fourth gear (1480) being raised or lowered as described herein.

When the fourth gear (1480) is lowered thereby meshing it with the third gear (1475) and the fifth gear (1485) as described herein, the vehicle engine system (1535) can be further configured to provide rotational motion to: the fourth gear (1480) via the third gear (1475); the fifth gear (1485) via the fourth gear (1480); the third segment (1445) via the fifth gear (1485); the fourth segment (1450) via the third segment (1445); the sixth gear (1495) via the fourth segment (1450); the first gear (1035) via the sixth gear (1495); the first vertical rotatable shaft (1010), the first external teeth gear (1040), the second external teeth gear (1045), and the third external teeth gear (1050) via the first gear (1035); the fifth segment (1455) via the sixth gear (1495); the seventh gear (1505) via the fifth segment (1455); the eighth gear (1510) via the seventh gear (1505); the ninth gear (1515) via the eighth gear (1510); the sixth segment (1460) via the ninth gear (1515); the seventh segment (1465) via the sixth segment (1460); the rear differential (1530) via the seventh segment (1465); the rear tires (not shown) via the rear differential (1530); and the first internal teeth cylinder (1145), the first external teeth cylinder (1150), the second internal teeth cylinder (1155), the second external teeth cylinder (1165), the fourth external teeth gear (1055), the third external teeth cylinder (1170), the third internal teeth cylinder (1180), the fourth external teeth cylinder (1185), and the fourth internal teeth cylinder (1190) via the third external teeth gear (1050) and the second vertical rotatable shaft (1065). The third external teeth gear (1050) and the eighth gear (1510) can be configured to provide equal rotational motion speed to the second vertical rotatable shaft (1065) thereby rotating the second vertical rotatable shaft (1065). Additionally, the rotational motion is also provided to: the first pair of rods (1205) via the third internal teeth cylinder (1180) and the fourth internal teeth cylinder (1190); the rectangular piece (1200) via the first pair of rods (1205); and the second pair of rods (1225) via the fourth internal teeth cylinder (1190) and the second vertical rotatable shaft (1605).

On the other hand, as the fourth gear (1480) is being raised thereby separating it from the third gear (1475) and the fifth gear (1485) as described herein, the vehicle engine system (1535) does not provide rotational motion to the aforementioned components except for the first segment (1435), the second segment (1440), the third gear (1475), the second gear (1085), the third vertical rotatable shaft (1100), the third pair of rods (1265), the fifth internal teeth cylinder (1250), the fifth external teeth cylinder (1255), the fifth pair of rods (1300), the internal bearing cylinder (1115), the fourth pair of rods (1280), the fourth vertical rotatable shaft (1120), and the gearbox (1135) of the carriage (1125) as previously mentioned. However, in such case, there are residual rotational motion provided to the fifth gear (1485), the third segment (1445), the fourth segment (1450), the sixth gear (1495), the first gear (1035), the first vertical rotatable shaft (1010), the first external teeth gear (1040), the second external teeth gear (1045), the third external teeth gear (1050), the fifth segment (1455), the seventh gear (1505), the eighth gear (1510), the ninth gear (1515), the sixth segment (1460), the seventh segment (1465), the rear differential (1530), the rear tires (not shown), the first internal teeth cylinder (1145), the first external teeth cylinder (1150), the second internal teeth cylinder (1155), the second external teeth cylinder (1165), the fourth external teeth gear (1055), the third external teeth cylinder (1170), the third internal teeth cylinder (1180), the fourth external teeth cylinder (1185), the fourth internal teeth cylinder (1190), the second vertical rotatable shaft (1065), the first pair of rods (1205), the rectangular piece (1200), and the second pair of rods (1225).

In an embodiment, the vehicle emergency system (1000) can further include a fifth vertical rotatable shaft (1540) comprising a first region (1545) and a second region (1550). The first region (1545) is configured to fixably attach to a second surface (1555) of the fourth gear (1480) of the first gearbox (1470). The second region (1550) passes through an orifice (1560) of the hollow rectangular support (1360) of the first rectangular hollow block (1345). A horizontal piece (1565) located within the hollow rectangular support (1360) of the first rectangular hollow block (1345). The horizontal piece (1565) is configured to fixably attach to a portion of the hollow rectangular support (1360) of the first rectangular hollow block (1345). The second region (1550) is configured to fixably attach to the horizontal piece (1565) to prevent the second region (1550) of the fifth vertical rotatable shaft (1540) from falling out of the hollow rectangular support (1360) of the first rectangular hollow block (1345).

The horizontal piece (1565) can be configured to move the fifth vertical rotatable shaft (1540) upward via the first rectangular hollow block (1345) thereby separating the fourth gear (1480) from the third gear (1475) and the fifth gear (1485) when the rectangular parallelepiped bar (1430) is raised via the electric jack (1375) as described herein. The horizontal piece (1565) can also be configured to move the fifth vertical rotatable shaft (1540) downward via the first rectangular hollow block (1345) thereby meshing the fourth gear (1480) with the third gear (1475) and the fifth gear (1485) when the rectangular parallelepiped bar (1315) is lowered via the electric jack (1375) as described herein.

In a further embodiment, the present subject matter relates to a gradual speed reduction system for a vehicle which includes a first vertical rotatable shaft (1010) comprising a first section (1015), a second section (1020), a third section (1025), and a fourth section (1030), with the second section (1020) and the third section (1025) located sequentially between the first section (1015) and the fourth section (1030); a first gear (1035), a first external teeth gear (1040), and a second external teeth gear (1045) fixably attached to the first vertical rotatable shaft (1010) and located at the first section (1015), the third section (1025), and the fourth section (1030) of the first vertical rotatable shaft (1010), respectively; a third external teeth gear (1050) configured to mesh and unmesh with the second external teeth gear (1045); a fourth external teeth gear (1055) located below the third external teeth gear (1050); a primary cylinder (1060) located below the fourth external teeth gear (1055); and a second vertical rotatable shaft (1065) configured to pass through the third external teeth gear (1050), the fourth external teeth gear (1055), and the primary cylinder (1060), wherein the second vertical rotatable shaft (1065) extends beyond the primary cylinder (1060) having a primary portion (1070) and a secondary portion (1075).

In an embodiment, the gradual speed reduction system (1005) can further include an internal teeth roller (1140) located above the third external teeth gear (1050). A first internal teeth cylinder (1145) is located between the internal teeth roller (1140) and the fourth external teeth gear (1055). Inner surfaces of the third external teeth gear (1050) are fixably attached to outer surfaces of the first internal teeth cylinder (1145).

A first external teeth cylinder (1150) is located between the internal teeth roller (1140) and the fourth external teeth gear (1055). Inner surfaces of the first internal teeth cylinder (1145) can be configured to mesh with outer surfaces of the first external teeth cylinder (1150). The outer surfaces of the first external teeth cylinder (1150) can also be configured to mesh and unmesh with inner surfaces of the internal teeth roller (1140).

A second internal teeth cylinder (1155) fixably attached to an upper surface (1160) of the fourth external teeth gear (1055) and located below the first external teeth cylinder (1150). A second external teeth cylinder (1165) located between the first external teeth cylinder (1150) and the second internal teeth cylinder (1155). Inner surfaces of the second internal teeth cylinder (1155) can be configured to mesh and unmesh with outer surfaces of the second external teeth cylinder (1165).

A third external teeth cylinder (1170) fixably attached to a lower surface (1175) of the fourth external teeth gear (1055) and located above the primary cylinder (1060). A third internal teeth cylinder (1180) located between the fourth external teeth gear (1055) and the primary cylinder (1060). Inner surfaces of the third internal teeth cylinder (1180) can be configured to mesh with outer surfaces of the third external teeth cylinder (1170).

A fourth external teeth cylinder (1185) located between the third external teeth cylinder (1170) and the primary cylinder (1060). A fourth internal teeth cylinder (1190) located between the fourth external teeth cylinder (1185) and the primary cylinder (1060). Inner surfaces of the fourth internal teeth cylinder (1190) can be configured to mesh and unmesh with outer surfaces of the fourth external teeth cylinder (1185).

The second vertical rotatable shaft (1065) is further configured to pass through the internal teeth roller (1140), the first internal teeth cylinder (1145), the first external teeth cylinder (1150), the second internal teeth cylinder (1155), the second external teeth cylinder (1165), the third external teeth cylinder (1170), the third internal teeth cylinder (1180), the fourth external teeth cylinder (1185), and the fourth internal teeth cylinder (1190).

In another embodiment, the gradual speed reduction system (1005) can further include a separator ring (1195) located between the first external teeth cylinder (1150) and the second external teeth cylinder (1165). The separator ring (1195) is fixably attached to the second vertical rotatable shaft (1065). The separator ring (1195) is configured to raise the first external teeth cylinder (1150) upward toward the internal teeth roller (1140) as the second internal teeth cylinder (1155) is being raised upward thereby allowing the third external teeth gear (1050) to be raised upward toward the internal teeth roller (1140) as described herein.

A rectangular piece (1200) located between the third internal teeth cylinder (1180) and the fourth external teeth cylinder (1185). A first pair of rods (1205) comprising: a first part (1210), a second part (not shown), and a third part (1215), with the second part (not shown) located between the first part (1210) and the third part (1215). The first part (1210) of each rod of the first pair of rods (1205) are fixably attached to opposite external surfaces of the third internal teeth cylinder (1180). The second part (not shown) of each rod of the first pair of rods (1205) passes through opposite sides of the rectangular piece (1200). The third part (1215) of each rod of the first pair of rods (1205) are fixably attached to opposite external surfaces of the fourth internal teeth cylinder (1190).

A first circular ring (1220) located between the fourth internal teeth cylinder (1190) and the primary cylinder (1060) and is configured to fixably attach to a portion of the second vertical rotatable shaft (1065). A second pair of rods (1225) comprising: a first peripheral section (1230) and a second peripheral section (1235). The first peripheral section (1230) of each rod of the second pair of rods (1225) are fixably attached to opposite external surfaces of the fourth internal teeth cylinder (1190). The second peripheral section (1235) of each rod of the second pair of rods (1225) are fixably attached to opposite external surfaces of the first circular ring (1220).

A mounting bracket (1240) located adjacent to the primary cylinder (1060) and is configured to fixably attach to the primary cylinder (1060). A stabilizing bracket (1245) is configured to fixably attach to the internal teeth roller (1140) and the mounting bracket (1240). Due to the attachments to the mounting bracket (1240) and the stabilizing bracket (1245), the primary cylinder (1060) and the internal teeth roller (1140) are configured to be nonrotatable.

In a further embodiment, the present subject matter relates to an emergency movement system for a vehicle which includes a second gear (1085) comprising a first end (1090) and a second end (1095); a third vertical rotatable shaft (1100) comprising a first distal part (1105) and a second distal part (1110), wherein the third vertical rotatable shaft (1100) is located below the second gear (1085), and the first distal part (1105) of the third vertical rotatable shaft (1100) is configured to fixably attach to the second end (1095) of the second gear (1085); an internal bearing cylinder (1115) comprising a fourth vertical rotatable shaft (1120), wherein the internal bearing cylinder (1115) is located below the third vertical rotatable shaft (1100) and is configured to fixably attach to the second distal part (1110) of the third vertical rotatable shaft (1100); and a carriage (1125) comprising four wheels (1130) and a gearbox (1135), wherein the carriage (1125) is located below the fourth vertical rotatable shaft (1120) and the gearbox (1135) is configured to engage with the fourth vertical rotatable shaft (1120) of the internal bearing cylinder (1115).

In an additional embodiment, the emergency movement system (1080) can further include a fifth internal teeth cylinder (1250) located between the second gear (1085) and the internal bearing cylinder (1115). A fifth external teeth cylinder (1255) located between the fifth internal teeth cylinder (1250) and the internal bearing cylinder (1115). Outer surfaces of the fifth external teeth cylinder (1255) can be configured to mesh and unmesh with inner surfaces of the fifth internal teeth cylinder (1250). The third vertical rotatable shaft (1100) is further configured to pass through the fifth internal teeth cylinder (1250) and the fifth external teeth cylinder (1255).

In a supplementary embodiment, the emergency movement system (1080) can further include a second circular ring (1260) located between the second gear (1085) and the fifth internal teeth cylinder (1250). The second circular ring (1260) is configured to fixably attach to a portion of the third vertical rotatable shaft (1100). A third pair of rods (1265) comprising: a first distal region (1270) and a second distal region (1275). The first distal region (1270) of each rod of the third pair of rods (1265) are fixably attached to opposite external surfaces of the fifth internal teeth cylinder (1250). The second distal region (1275) of each rod of the third pair of rods (1265) are fixably attached to opposite external surfaces of the second circular ring (1260).

A fourth pair of rods (1280) comprising: a first distal (1285) section and a second distal section (1290). The first distal section (1285) of each rod of the fourth pair of rods (1280) are fixably attached to opposite external surfaces of the fifth internal teeth cylinder (1250). The second distal section (1290) of each rod of the fourth pair of rods (1280) are fixably attached to opposite external surfaces of the internal bearing cylinder (1115).

A third circular ring (1295) located between the fifth external teeth cylinder (1255) and the internal bearing cylinder (1115). The third circular ring (1295) is configured to fixably attach to a portion of the third vertical rotatable shaft (1100). A fifth pair of rods (1300) comprising: a first distal portion (1305) and a second distal portion (1310). The first distal portion (1305) of each rod of the fifth pair of rods (1300) are fixably attached to opposite upper external surfaces of the internal bearing cylinder (1115). The second distal portion (1310) of each rod of the fifth pair of rods (1300) are fixably attached to opposite external surfaces of the third circular ring (1295).

In a further embodiment, the present subject matter relates to a method of using the above vehicle emergency system (1000) for gradually stopping the vehicle (not shown) which includes driving the vehicle (not shown) thereby causing the rear tires of the vehicle (not shown) to rotate via the rotational motion from the vehicle engine system (1535); engaging in a vehicle emergency; pressing the raising button (1410) from the controller (1405) to send the first signal to the electric motor (1400) to activate the electric jack (1375) to raise the rectangular parallelepiped bar (1315); raising the first rectangular hollow block (1345) as the rectangular parallelepiped bar (1315) is being raised thereby moving the fifth vertical rotatable shaft (1540) upward resulting in the fourth gear (1480) separating from the third gear (1475) and the fifth gear (1485); simultaneously raising the gradual speed reduction system (1005) as the first rectangular hollow block (1345) is being raised via the rectangular parallelepiped bar (1315); providing residual rotational motion to: the fifth gear (1485), the third segment (1445), the fourth segment (1450), the sixth gear (1495), the first gear (1035), the first vertical rotatable shaft (1010), the first external teeth gear (1040), the second external teeth gear (1045), the third external teeth gear (1050), the fifth segment (1455), the seventh gear (1505), the eighth gear (1510), the ninth gear (1515), the sixth segment (1460), the seventh segment (1465), the rear differential (1530), the rear tires (not shown), the second vertical rotatable shaft (1065), the first internal teeth cylinder (1145), the first external teeth cylinder (1150), the second internal teeth cylinder (1155), the second external teeth cylinder (1165), the fourth external teeth gear (1055), the third external teeth cylinder (1170), the third internal teeth cylinder (1180), the fourth external teeth cylinder (1185), the fourth internal teeth cylinder (1190), the first pair of rods (1205), the rectangular piece (1200), and the second pair of rods (1225) as the fourth gear (1480) is being separated from the third gear (1475) and the fifth gear (1485); raising the fourth internal teeth cylinder (1190) towards the fourth external teeth cylinder (1185) to mesh the inner surfaces of the fourth internal teeth cylinder (1190) with the outer surfaces of the fourth external teeth cylinder (1185) as the gradual speed reduction system (1005) is being raised; simultaneously raising the third internal teeth cylinder (1180) towards the fourth external teeth gear (1055) to lift the fourth external teeth gear (1055) towards the third external teeth gear (1050) as the fourth internal teeth cylinder (1190) is being raised; raising the second internal teeth cylinder (1155) towards the second external teeth cylinder (1165) to mesh the inner surfaces of the second internal teeth cylinder (1155) with the outer surfaces of the second external teeth cylinder (1165) as the fourth external teeth gear (1055) is being lifted, wherein the meshing of the second internal teeth cylinder (1155) and the second external teeth cylinder (1165) causes the separator ring (1195) to raise the first external teeth cylinder (1150) towards the internal teeth roller (1140); meshing the outer surfaces of the first external teeth cylinder (1150) with the inner surfaces of the internal teeth roller (1140) thereby gradually reducing residual rotational motion speed resulting in the vehicle gradually stopping; and simultaneously raising the third external teeth gear (1050) towards the internal teeth roller (1140) thereby unmeshing the third external teeth gear (1050) from the second external teeth gear (1045) as the first external teeth cylinder (1150) is being raised.

In an embodiment, the vehicle emergency can be selected from the group consisting of faulty brakes, breakage of the vehicle rim(s), tire(s) blowout, faulty airbag(s), stuck accelerator pedal, steering failure, broken steering wheel, faulty suspension, other vehicle emergencies, or combinations thereof.

In another embodiment, the method can further include providing the rotational motion via the third gear (1475) of the first gearbox (1470) to: the second gear (1085), the third vertical rotatable shaft (1100), the third pair of rods (1265), the fifth internal teeth cylinder (1250), the fifth external teeth cylinder (1255), the fifth pair of rods (1300), the internal bearing cylinder (1115), the fourth pair of rods (1280), the fourth vertical rotatable shaft (1120), and the gearbox (1135) of the carriage (1125) as the fourth gear (1480) is being separated from the third gear (1475) and the fifth gear (1485). By providing rotational motion to the gearbox (1135) of the carriage (1125), the driver of the vehicle can steer the vehicle to a safe location (i.e., to a side of a road) during the emergency.

It is to be understood that the vehicle emergency system, the gradual speed reduction system for a vehicle, the emergency movement system for a vehicle, and the method of using the vehicle emergency system for gradually stopping a vehicle are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A gradual speed reduction system for a vehicle, the system comprising:
a first vertical rotatable shaft comprising a first section, a second section, a third section, and a fourth section, with the second section and the third section located sequentially between the first section and the fourth section;
a first gear, a first external teeth gear, and a second external teeth gear fixably attached to the first vertical rotatable shaft and located at the first section, the third section, and the fourth section of the first vertical rotatable shaft, respectively;
a third external teeth gear is configured to mesh and unmesh with the second external teeth gear;
a fourth external teeth gear located below the third external teeth gear;
a primary cylinder located below the fourth external teeth gear; and
a second vertical rotatable shaft is configured to pass through the third external teeth gear, the fourth external teeth gear, and the primary cylinder, wherein the second vertical rotatable shaft extends beyond the primary cylinder having a primary portion and a secondary portion.

2. The system of claim 1, wherein the system further comprising:
an internal teeth roller located above the third external teeth gear;
a first internal teeth cylinder located below the internal teeth roller and above the fourth external teeth gear, wherein inner surfaces of the third external teeth gear are fixably attached to outer surfaces of the first internal teeth cylinder;
a first external teeth cylinder located below the internal teeth roller and above the fourth external teeth gear, wherein inner surfaces of the first internal teeth cylinder are configured to mesh with outer surfaces of the first external teeth cylinder and the first external teeth cylinder is configured to mesh and unmesh with the internal teeth roller;
a second internal teeth cylinder fixably attached to an upper surface of the fourth external teeth gear and located below the first external teeth cylinder;
a second external teeth cylinder located between the first external teeth cylinder and the second internal teeth cylinder, wherein inner surfaces of the second internal teeth cylinder are configured to mesh and unmesh with outer surfaces of the second external teeth cylinder;
a third external teeth cylinder fixably attached to a lower surface of the fourth external teeth gear and located above the primary cylinder;
a third internal teeth cylinder located below the fourth external teeth gear and above the primary cylinder, wherein inner surfaces of the third internal teeth cylinder are configured to mesh with outer surfaces of the third external teeth cylinder;
a fourth external teeth cylinder located below the third external teeth cylinder and above the primary cylinder;
a fourth internal teeth cylinder located below the fourth external teeth cylinder and above the primary cylinder, wherein inner surfaces of the fourth internal teeth cylinder are configured to mesh and unmesh with outer surfaces of the fourth external teeth cylinder; and
wherein the second vertical rotatable shaft is further configured to pass through the internal teeth roller, the first internal teeth cylinder, the first external teeth cylinder, the second internal teeth cylinder, the second external teeth cylinder, the third external teeth cylinder, the third internal teeth cylinder, the fourth external teeth cylinder, and the fourth internal teeth cylinder.

3. The system of claim 2, wherein the system further comprising:
a separator ring located between the first external teeth cylinder and the second external teeth cylinder;
a rectangular piece located between the third internal teeth cylinder and the fourth external teeth cylinder;
a first pair of rods comprising:
a first part, a second part, and a third part, with the second part located between the first part and the third part;
the first part of each rod of the first pair of rods are fixably attached to opposite external surfaces of the third internal teeth cylinder,
the second part of each rod of the first pair of rods passes through opposite sides of the rectangular piece; and
the third part of each rod of the first pair of rods are fixably attached to opposite external surfaces of the fourth internal teeth cylinder;
a first circular ring is located between the fourth internal teeth cylinder and the primary cylinder and is configured to fixably attach to a portion of the second vertical rotatable shaft;
a second pair of rods comprising:
a first peripheral section and a second peripheral section;
the first peripheral section of each rod of the second pair of rods are fixably attached to opposite external surfaces of the fourth internal teeth cylinder; and
the second peripheral section of each rod of the second pair of rods are fixably attached to opposite external surfaces of the first circular ring;
a mounting bracket located adjacent to the primary cylinder and is configured to fixably attach to the primary cylinder; and
a stabilizing bracket is configured to fixably attach to the internal teeth roller and the mounting bracket.

4. An emergency movement system for a vehicle, the system comprising:
a second gear comprising a first end and a second end;
a third vertical rotatable shaft comprising a first distal part and a second distal part, wherein the third vertical rotatable shaft is located below the second gear and the first distal part of the third vertical rotatable shaft is configured to fixably attach to the second end of the second gear;
an internal bearing cylinder comprising a fourth vertical rotatable shaft, wherein the internal bearing cylinder is located below the third vertical rotatable shaft and is configured to fixably attach to the second distal part of the third vertical rotatable shaft; and
a carriage comprising four wheels and a gearbox, wherein the carriage is located below the fourth vertical rotatable shaft and the gearbox is configured to engage with the fourth vertical rotatable shaft of the internal bearing cylinder.

5. The system of claim 4, wherein the system further comprising:
a fifth internal teeth cylinder located between the second gear and the internal bearing cylinder;
a fifth external teeth cylinder located between the fifth internal teeth cylinder and the internal bearing cylinder, wherein outer surfaces of the fifth external teeth cylinder are configured to mesh and unmesh with inner surfaces of the fifth internal teeth cylinder; and wherein the third vertical rotatable shaft is further configured to pass through the fifth internal teeth cylinder and the fifth external teeth cylinder.

6. The system of claim 5, wherein the system further comprising:

a second circular ring located between the second gear and the fifth internal teeth cylinder and is configured to fixably attach to a portion of the third vertical rotatable shaft;

a third pair of rods comprising:
  a first distal region and a second distal region;
  the first distal region of each rod of the third pair of rods are fixably attached to opposite external surfaces of the fifth internal teeth cylinder; and
  the second distal region of each rod of the third pair of rods are fixably attached to opposite external surfaces of the second circular ring;

a fourth pair of rods comprising:
  a first distal section and a second distal section;
  the first distal section of each rod of the fourth pair of rods are fixably attached to opposite external surfaces of the fifth internal teeth cylinder; and
  the second distal section of each rod of the fourth pair of rods are fixably attached to opposite external surfaces of the internal bearing cylinder;

a third circular ring located between the fifth external teeth cylinder and the internal bearing cylinder and is configured to fixably attach to a portion of the third vertical rotatable shaft;

and a fifth pair of rods comprising:
  a first distal portion and a second distal portion;
  the first distal portion of each rod of the fifth pair of rods are fixably attached to opposite upper external surfaces of the internal bearing cylinder; and
  the second distal portion of each rod of the fifth pair of rods are fixably attached to opposite external surfaces of the third circular ring.

* * * * *